(12) United States Patent
Smith, III

(10) Patent No.: US 7,163,190 B2
(45) Date of Patent: Jan. 16, 2007

(54) UNDERSEA HYDRAULIC COUPLING MEMBER AND SEAL RETAINER

(75) Inventor: Robert E. Smith, III, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 499 days.

(21) Appl. No.: 10/211,828

(22) Filed: Aug. 2, 2002

(65) Prior Publication Data

US 2004/0021114 A1 Feb. 5, 2004

(51) Int. Cl.
*F16L 37/28* (2006.01)

(52) U.S. Cl. .................................................. 251/149.6

(58) Field of Classification Search ............. 251/149.6, 251/149.1; 137/614.04

See application file for complete search history.

(56) References Cited

U.S. PATENT DOCUMENTS

| | | | |
|---|---|---|---|
| 2,265,267 A | 12/1941 | Cowles | 284/19 |
| 2,598,009 A | 5/1952 | Peeps | 284/19 |
| 3,288,472 A | 11/1966 | Watkins | 277/11 |
| 4,694,859 A | 9/1987 | Smith, III | 137/614.04 |
| 4,709,726 A | 12/1987 | Fitzgibbons | 137/614.04 |
| 4,768,538 A | 9/1988 | Mintz et al. | 137/15 |
| 4,832,080 A | 5/1989 | Smith, III | 137/614.04 |
| 4,834,139 A | 5/1989 | Fitzgibbons | 137/614.04 |
| 4,900,071 A | 2/1990 | Smith, III | 285/379 |
| 5,052,439 A | 10/1991 | Smith, III | 137/614.04 |
| 5,099,882 A | 3/1992 | Smith, III | 137/614.04 |
| 5,203,374 A | 4/1993 | Smith, III | 137/614.04 |
| 5,368,070 A | 11/1994 | Bosley | 137/614.04 |
| 5,544,858 A * | 8/1996 | Rogers et al. | 251/149.6 |
| 5,553,638 A * | 9/1996 | Home | 251/149.6 |
| 5,556,139 A | 9/1996 | Wilkins | 285/111 |
| 5,762,106 A | 6/1998 | Smith, III | 137/614.04 |
| 5,771,927 A | 6/1998 | Johansen et al. | 137/614.04 |
| 5,806,832 A * | 9/1998 | Larbuisson | 251/149.6 |
| 6,007,106 A | 12/1999 | Wilkins | 285/110 |
| 6,123,103 A | 9/2000 | Smith, III. | 137/614.04 |
| 6,202,691 B1 * | 3/2001 | Smith, III | 137/614.04 |

* cited by examiner

*Primary Examiner*—John Bastianelli
(74) *Attorney, Agent, or Firm*—Wong, Cabello, Lutsch, Rutherford & Brucculeri, LLP

(57) ABSTRACT

An undersea hydraulic coupling member having a seal retainer with a first inner ring and a second outer ring is disclosed. The first inner ring and second outer ring are concentric, at least part of the first inner ring inserted through the second outer ring. The second outer ring is threaded to the coupling member to provide sufficient torque to reduce or eliminate any gap between the seal retainer and the shoulder surface in the coupling member on which an elastomeric seal is positioned. Another elastomeric seal is held between the first inner ring and second outer ring of the seal retainer.

17 Claims, 11 Drawing Sheets

UNDERSEA HYDRAULIC COUPLING MEMBER AND SEAL RETAINER

BACKGROUND OF THE INVENTION

1. Field of the Invention

This invention relates, in general, to hydraulic couplings, and specifically to hydraulic couplings used in undersea drilling and production applications. More particularly, the invention involves undersea hydraulic couplings having seal retainers that are engaged to the female coupling member.

2. Description of Related Art

Subsea hydraulic couplings are old in the art. The couplings generally consist of a male member and a female member with seals to seal the junction between the male and female members. The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a probe section insertable into the large bore of the female member. According to various embodiments of the device, the seals either abut the end, or face, of the male member or engage the male member about its outer circumference. Hydraulic fluid is then free to flow through the female and male portions of the coupling and seals prevent that flow from escaping about the joints of the coupling.

Optionally, a check valve may be installed in the female member and also in the male member. Each check valve is open when the coupling is made up; however, each check valve closes when the coupling is broken so as to prevent fluid from leaking out of the system of which the coupling is part.

In U.S. Pat. Nos. 4,694,859 and 5,762,106 to Robert E. Smith III, an undersea hydraulic coupling and metal seal is disclosed. A reusable metal seal engages the circumference of the probe when it is positioned within the female member body. The seal is held in place by a cylindrical seal retainer. When the male and female portions of the coupling are parted under pressure, the seal retainer prevents the metal seal from blowing out through the bore of the female member.

U.S. Pat. Nos. 4,900,071 and 5,052,439 to Robert E. Smith III disclose an undersea hydraulic coupling with an elastomeric seal that is restrained from radial movement into the central bore of the female member by a circumferential shoulder on one or both surfaces adjacent the seal. Preferably, the seal has a dovetail interfit with one or both surfaces. U.S. Pat. Nos. 5,099,882, 5,203,374, 5,232,021 to Robert E. Smith III also show undersea hydraulic couplings with these seals. An inner cylindrical surface of the annular seal engages the circumference of the male member or probe as the probe is inserted into the female member. As the male member or probe is pulled out of the female member bore, the leading face of the male member reaches the soft annular seal intermediate that bore. When the face reaches the midpoint of the soft annular seal, the dovetail interfit prevents the seal being imploded into the bore, as the seawater and/or hydraulic fluid enter the bore at high pressure.

To retain one or more seals in the female member of an undersea hydraulic coupling, a seal retainer may be attached to the female member. The seal retainer may be a generally sleeve-shaped cylindrical body that is inserted into the bore of the female member until the seal retainer abuts a shoulder in the bore of female member. To secure the seal retainer against the shoulder, a retainer locking member may also be attached to the female member using threads or snap rings, for example. A radial seal may be retained between the seal retainer and retainer locking member. Additionally, one or more face seals may be positioned between the seal retainer and shoulder.

In subsea drilling and production applications, a small gap may exist between the seal retainer and internal shoulder of female subsea hydraulic coupling members. This gap may exist as a result of very high pressures and/or high temperatures at subsea depths, tending to loosen the seal retainers and/or retainer locking members. It can be difficult to overcome this problem and eliminate the gap by increasing the torque applied to the retainer locking member which secures and holds the seal retainer in abutment against the shoulder. As a result of the gap formed due to high temperatures and pressures at subsea depths, seals positioned in the female coupling member between the seal retainer and shoulder may extrude into and through the gap between those two components, causing leakage of hydraulic fluid from the coupling and/or seawater into the coupling. Accordingly, an undersea hydraulic coupling is needed having a seal retainer that reduces or eliminates any gap between the seal retainer and shoulder in the female coupling member.

SUMMARY OF THE INVENTION

The present invention provides an undersea hydraulic coupling member with a seal retainer having a pair of concentric rings. At least part of the first inner ring, or seal cartridge, fits inside the second outer ring, or threaded shell. The first inner ring may be inserted into the second outer ring before the assembly enters the female member of the coupling. When the seal retainer is fully inserted into the bore of the female coupling member, the first inner ring abuts an internal shoulder in the bore. At least part of the second outer ring is threaded to the female member to hold the inner ring tightly against the shoulder, reducing or eliminating any gap between the seal retainer and shoulder, and preventing extrusion of a seal into the gap due to high pressure and/or high temperatures subsea.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Undersea hydraulic couplings are generally connected to opposing plates of a manifold and are held together by bolts or hydraulic members attached to the plates. The male and female members may be attached to the opposing plates using various means, such as set screws or threads. Techniques for attaching members to such plates are well known to those skilled in the art.

Figure 1:
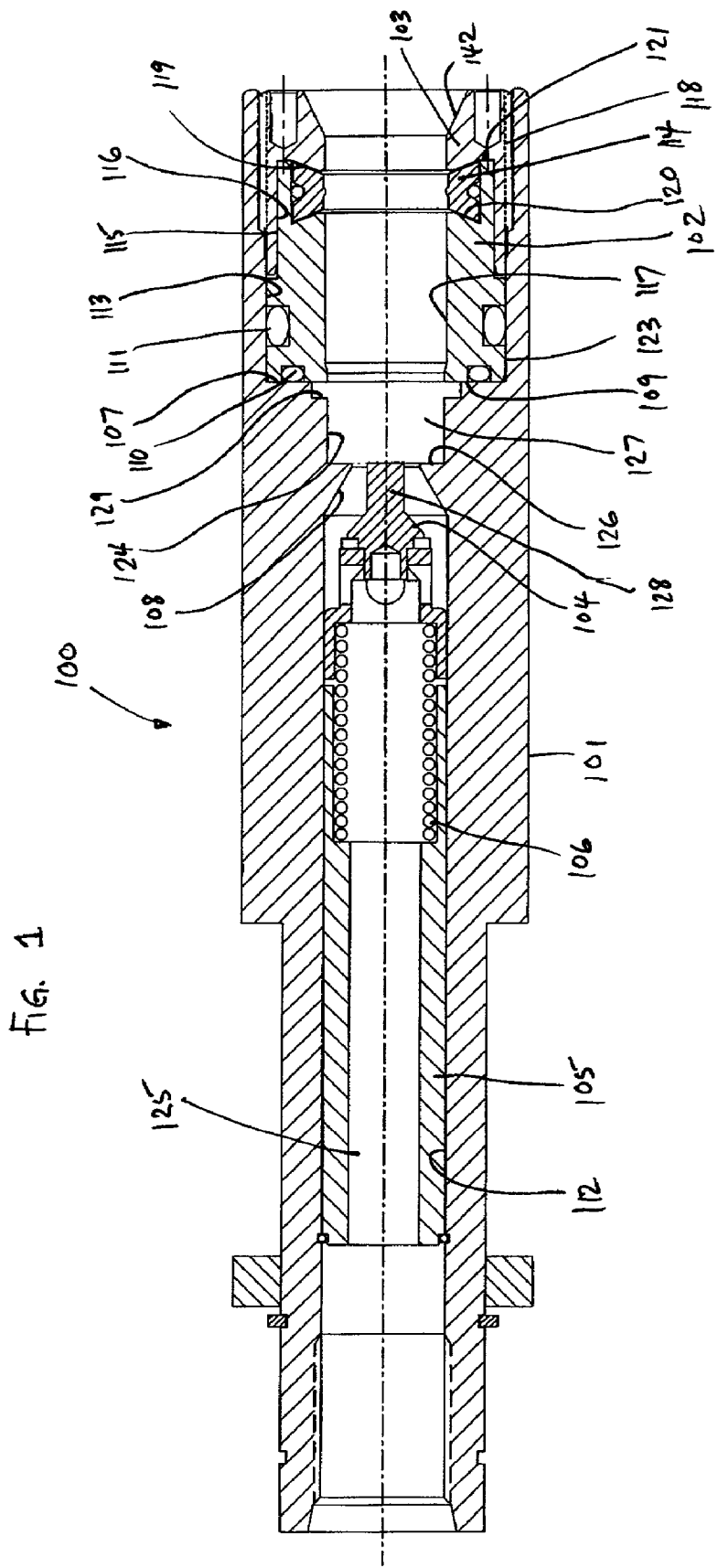
FIG. 1 is a section view of the female member of the coupling of the present invention according to a first embodiment.

As shown in FIG. 1, in a first embodiment, female member 100 comprises body 101 with a central bore 125 which has several variations in its diameter as it extends through the female member. The first end of the bore may be internally threaded for connection to a hydraulic line. A cylindrical passageway extends longitudinally within the female member body and terminates at valve seat 108. Adjacent valve seat 108 is shoulder 126 which forms one end of receiving chamber 127.

In the first embodiment, the receiving chamber which receives the probe of a male coupling member has a stepped internal diameter with an internal shoulder 107 between a first smaller diameter 124 and a second larger diameter 113. Optionally, a second internal shoulder 129 may be included in the receiving chamber. A ring shaped seal (not shown) may be positioned on shoulder 129 in the receiving chamber of the female member. The ring shaped seal may be a metal seal, or an elastomeric or polymer seal.

The female member may include poppet valve 104 which is slidably received within cylindrical passageway 112. The poppet valve is conical in shape and has an actuator 128 extending from the apex of the poppet valve. The poppet valve is urged by valve spring 106 into a closed position against valve seat 108. When the poppet valve is in the closed position against the valve seat, it seals fluid from flowing through the female member. Hollow spring collar 105 anchors the valve spring 106 and is held in place by a collar clip.

The seal retainer in a first embodiment of the invention comprises first inner ring 102, or seal cartridge, and second outer ring 103, or threaded shell. Both rings are positioned in the receiving chamber of the female member for holding one or more seals in the female member, even when the coupling members are disengaged. The first inner ring and second outer ring are concentric, with at least part of the first inner ring fitting radially inside the second outer ring. In one embodiment of the invention, inserting the first inner ring into the second outer ring engages the pair of rings together. The rings may be permanently engaged or removably engaged together.

Figure 7:
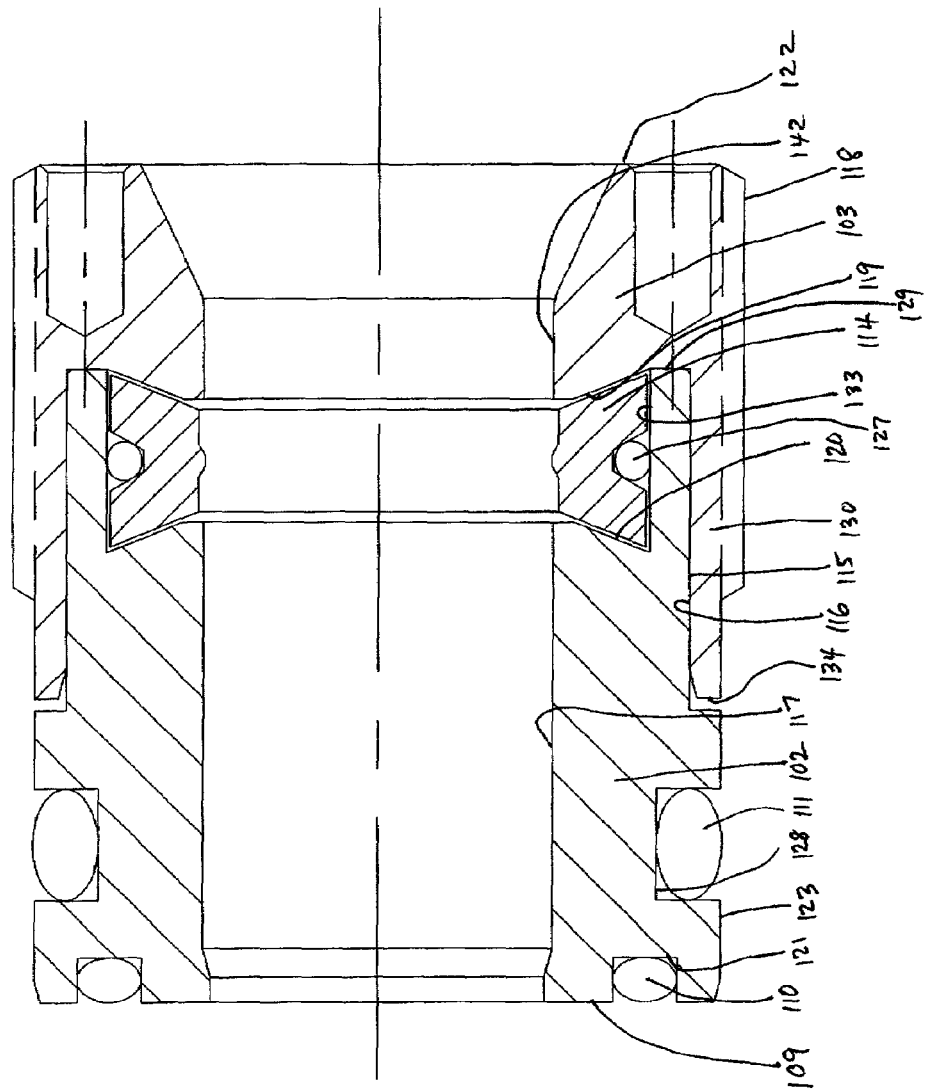
FIG. 7 is a section view of the seal retainer of the coupling of the present invention according to the embodiment of FIG. 1.

A first embodiment of the seal retainer of the present invention is shown in more detail in FIG. 7. The first inner ring 102, or seal cartridge, is positioned inside the second outer ring 103, or threaded shell. This may be done before the pair of rings are inserted into the receiving chamber. If desired, there may be a slight interference fit between the pair of rings.

As the seal retainer is fully inserted into the receiving chamber, first end 109 of first inner ring 102 abuts shoulder 107. The first end of the first inner ring may include a groove 121 for holding elastomeric O-ring 110 which provides a seal between the receiving chamber and the first end of the inner ring. The first inner ring 102 has a stepped outer circumference, with a first outer circumference 123 and a second outer circumference 115 having a smaller diameter than the first outer circumference. The first outer circumference may include a circumferential groove 128 for positioning O-ring seal 111. Seawater may enter the female coupling member between the seal retainer and receiving chamber, and exert hydrostatic pressure against the O-ring 111 in groove 128. This hydrostatic pressure may energize the O-ring and urge the first end 109 of first inner ring 102 against the shoulder 107. As a result, O-ring 111 may significantly enhance and increase the force to provide and maintain contact pressure between the seal retainer and the shoulder in the receiving chamber of the female coupling member. The first outer circumference may have a sliding fit with diameter 113 of the receiving chamber. The second outer circumference fits into part of the second ring 103 of the seal retainer, and terminates at second end 129. The first inner ring also has a stepped inner circumference, with a first inner circumference 117 extending from the first end 109 to inclined shoulder 120, and a second inner circumference 133 from shoulder 120 to the second end 129.

The second outer ring 103, or threaded shell, is concentric with the inner ring. The second outer ring has a first inner circumference 116 and a smaller second inner circumference 142. The first inner circumference of the second outer ring is dimensioned to receive the second outer circumference of the first inner ring. At least part of the outer circumference 118 of the second outer ring is threaded for engagement with the female coupling member. The first inner ring may be inserted through the threaded area of the second outer ring. The threaded area may extend from the first end 122 of the second outer ring to the second end 134 of the second outer ring, or may terminate at a position along section 130 before reaching the second end. Preferably, the threaded area extends at least one half of the combined length of the first and second rings when they are assembled together. The threaded area is sufficient to apply and maintain torque to the second outer ring to eliminate or minimize any gap between the first end 109 of the first inner ring and the shoulder in the female member receiving chamber.

An elastomeric seal 114 may be positioned between inclined shoulder 120 of the first inner ring and inclined shoulder 119 of the second outer ring. The inclined shoulders restrain the seal from radial movement or implosion due to a vacuum when the male member is withdrawn from the receiving chamber. The seal has a thicker outer diameter than inner diameter, and may have a dovetail interfit with the inclined shoulders. The seal also may include an O-ring 127 in a groove at its outer circumference.

Figure 2:
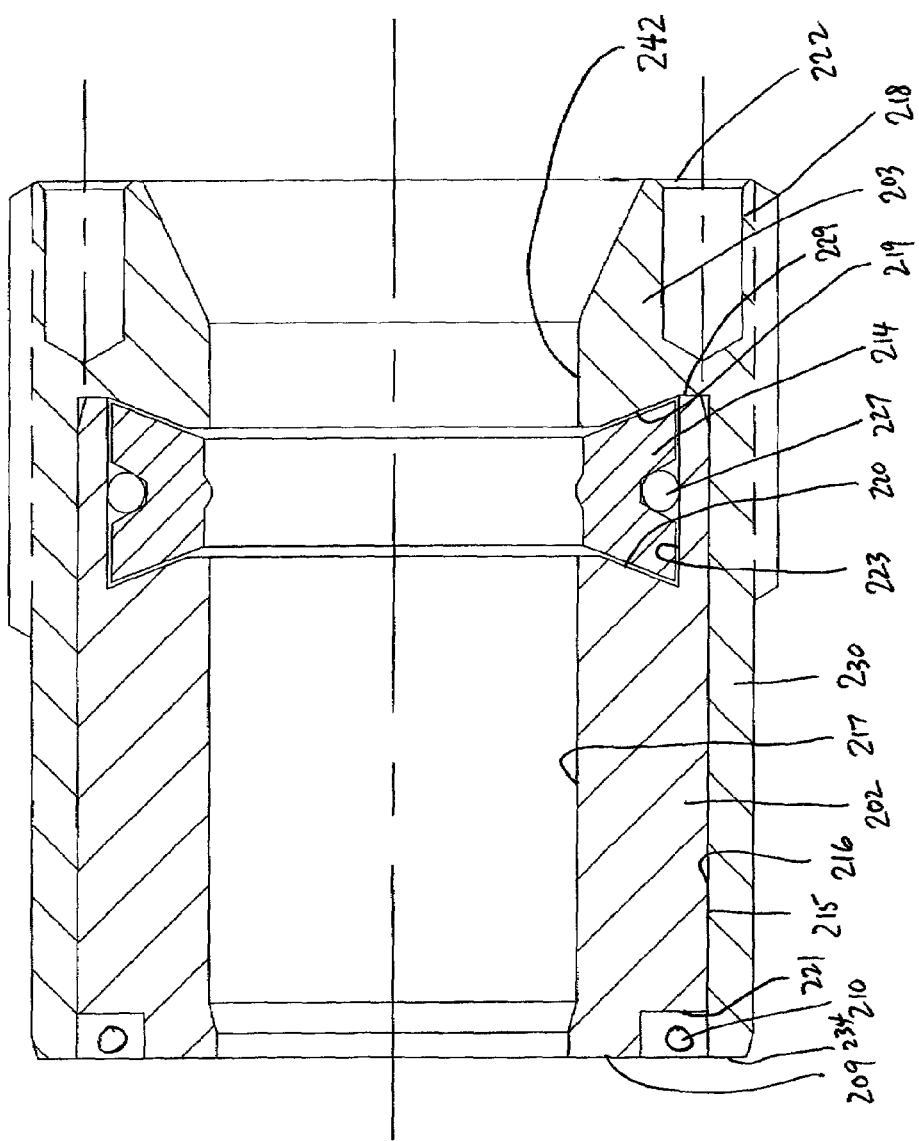
FIG. 2 is a section view of the seal retainer of the coupling of the present invention according to a second embodiment.

A second embodiment of the seal retainer of the invention is shown in FIG. 2. The first inner ring 202, or seal cartridge, is positioned inside the second outer ring 203, or threaded shell. If desired, there may be a slight interference fit. Fully inserted into the receiving chamber, first end 209 of first inner ring 202 abuts a shoulder in the receiving chamber. The first end of the first inner ring may include a groove 221 for holding elastomeric O-ring 210 which provides a seal between the receiving chamber and the first end of the inner ring. The first inner ring 202 has an outer circumference 215 that terminates at second end 229. The outer circumference of the first inner ring fits into the second ring 203 of the seal retainer. The first inner ring has a stepped inner circumference, with a first inner circumference 217 extending from the first end 209 to inclined shoulder 220, and a second inner circumference 223 from shoulder 220 to the second end 229.

The second outer ring 203, or threaded shell, is concentric with the inner ring. The second outer ring has a first inner circumference 216 and a smaller second inner circumference 242. The first inner circumference of the second outer ring is dimensioned to receive the outer circumference of the first inner ring. At least part of the outer circumference 218 of the second outer ring is threaded for engagement with the female coupling member. The threaded area may extend from the first end 222 of the second outer ring to the second end 234 of the second outer ring, or may terminate at a position along section 230 before reaching the second end. Preferably, the threaded area extends at least one half of the combined length of the first and second rings when they are assembled together. The threaded area allows application of sufficient torque to the second outer ring that eliminates or minimizes any gap between the first end 209 of the inner ring and the shoulder in the female member receiving chamber.

An elastomeric seal 214 may be positioned between inclined shoulder 220 of the first inner ring and inclined shoulder 219 of the second outer ring. The seal is generally wedge-shaped in cross section, and the inclined shoulders restrain the seal from radial movement or implosion due to a vacuum when the male member is withdrawn from the receiving chamber. The seal may have a dovetail interfit with the inclined shoulders. The seal also may include an O-ring 227 in a groove at its outer circumference.

Figure 3:
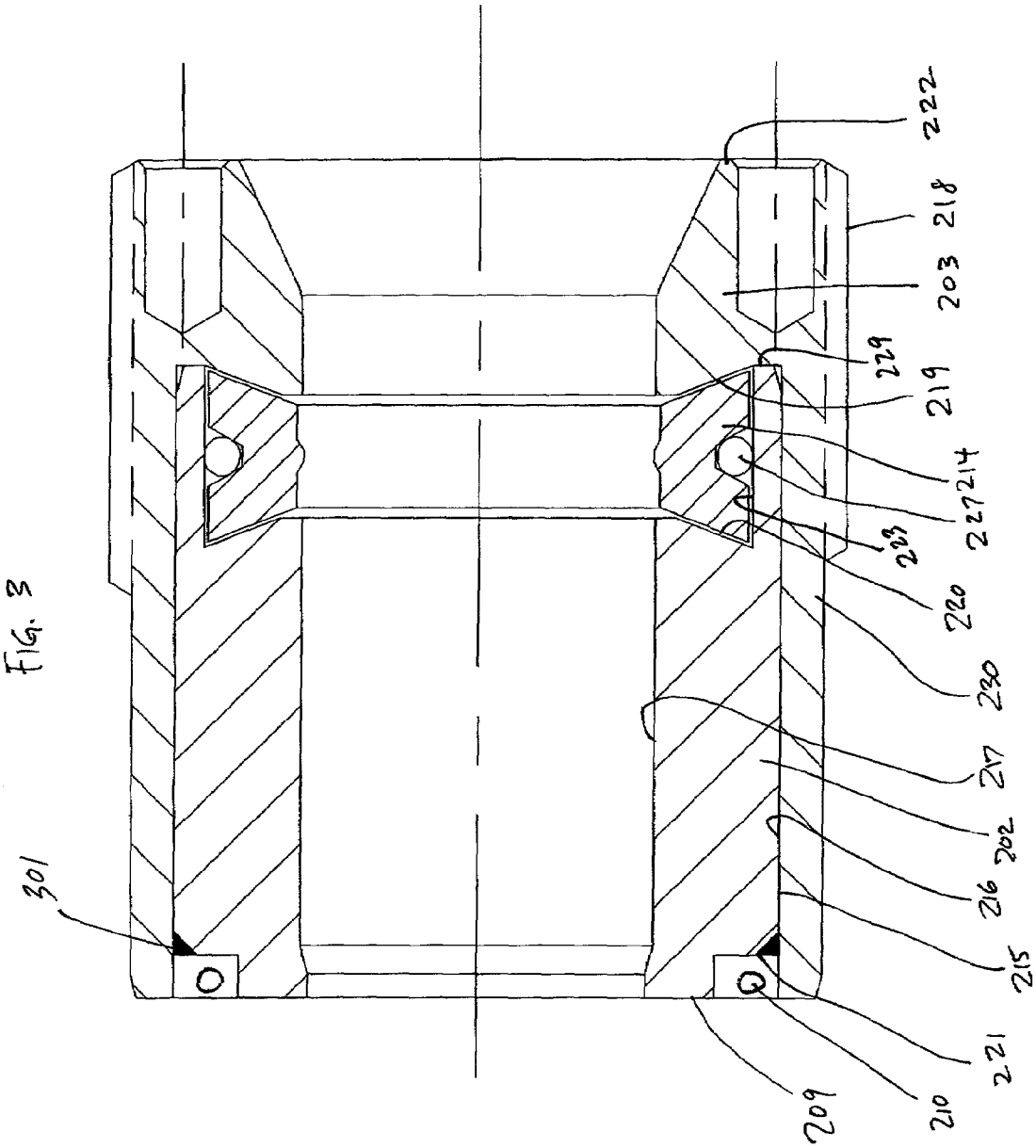
FIG. 3 is a section view of the seal retainer of the coupling of the present invention according to a third embodiment.

In a third embodiment of the invention, as shown in FIG. 3, the first inner ring and second outer ring of the seal retainer are the same as the second embodiment, with a weld 301 between the outer circumference 215 of the inner ring and the first inner circumference 216 of the outer ring to permanently engage the first inner ring and second outer ring.

Figure 4:
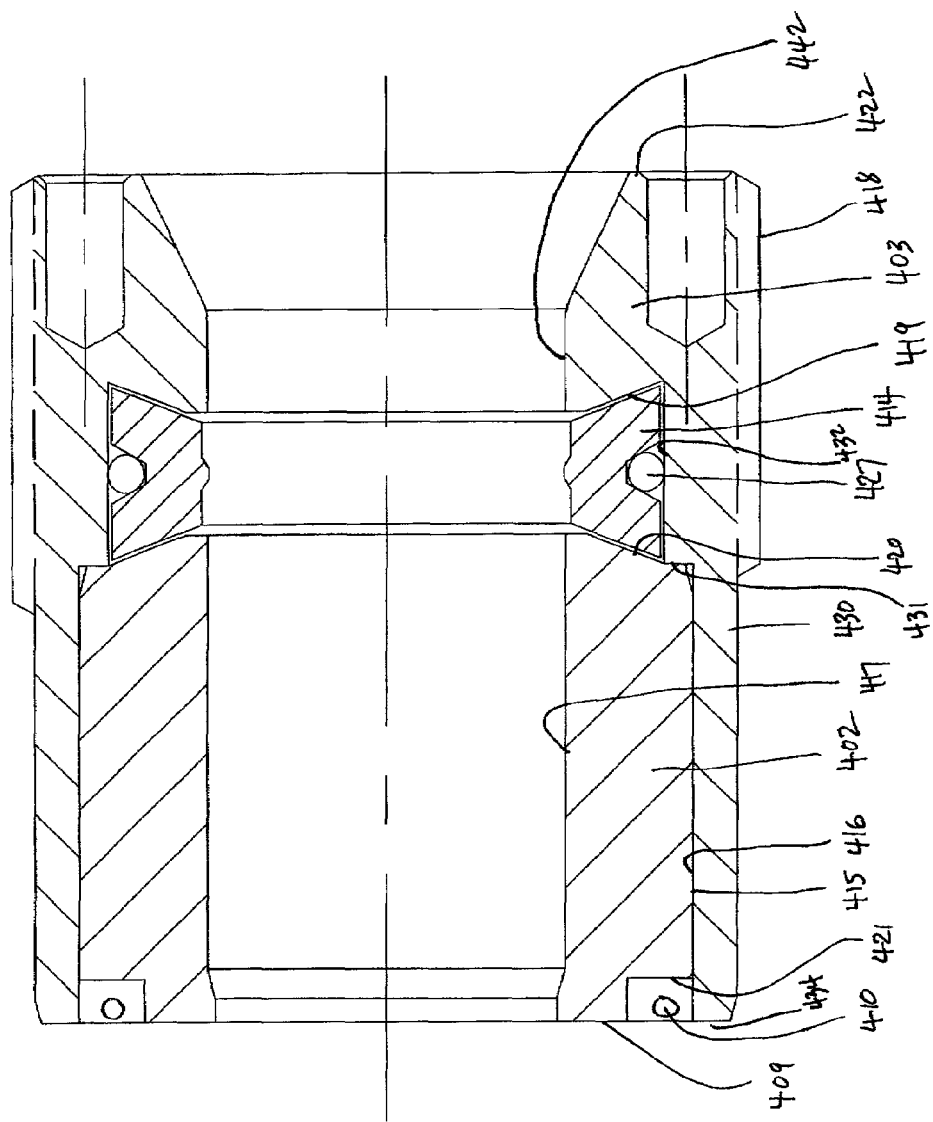
FIG. 4 is a section view of the seal retainer of the coupling of the present invention according to a fourth embodiment.

A fourth embodiment of the seal retainer of the invention is shown in FIG. 4. The first inner ring 402, or seal cartridge, is positioned inside the second outer ring 403, or threaded shell. If desired, there may be a slight interference fit. Fully inserted into the receiving chamber, first end 409 of first inner ring 402 abuts a shoulder in the receiving chamber. The first end of the first inner ring may include a groove 421 for holding elastomeric O-ring 410 which provides a seal between the receiving chamber and the first end of the inner ring. The first inner ring 402 has an outer circumference 415. The outer circumference fits into part of the second ring 403 of the seal retainer. The first inner ring has an inner circumference 417 extending from the first end 409 to inclined shoulder 420.

The second outer ring 403, or threaded shell, is concentric with the inner ring. The second outer ring has a first inner circumference 416, a smaller second inner circumference 432, and a still smaller third inner circumference 442. There is a shoulder 431 between the first and second inner circumferences. The first inner circumference of the second outer ring is dimensioned to receive the outer circumference of the first inner ring. At least part of the outer circumference 418 of the second outer ring is threaded for engagement with the female coupling member. The threaded area may extend from the first end 422 of the second outer ring to the second end 434 of the second outer ring, or may terminate at a position along section 430 before reaching the second end. Preferably, the threaded area extends at least one half of the combined length of the first and second rings when they are assembled together. The threaded area is sufficient to apply and maintain torque to the second outer ring that eliminates or minimizes any gap between the first end 409 of the inner ring and the shoulder in the female member receiving chamber.

An elastomeric seal 414 may be positioned between inclined shoulder 420 of the first inner ring and inclined shoulder 419 of the second outer ring. The inclined shoulders restrain the seal from radial movement or implosion due to a vacuum when the male member is withdrawn from the receiving chamber. The seal may have a dovetail interfit with the inclined shoulders. The seal also may include an O-ring 427 in a groove at its outer circumference.

Figure 5:
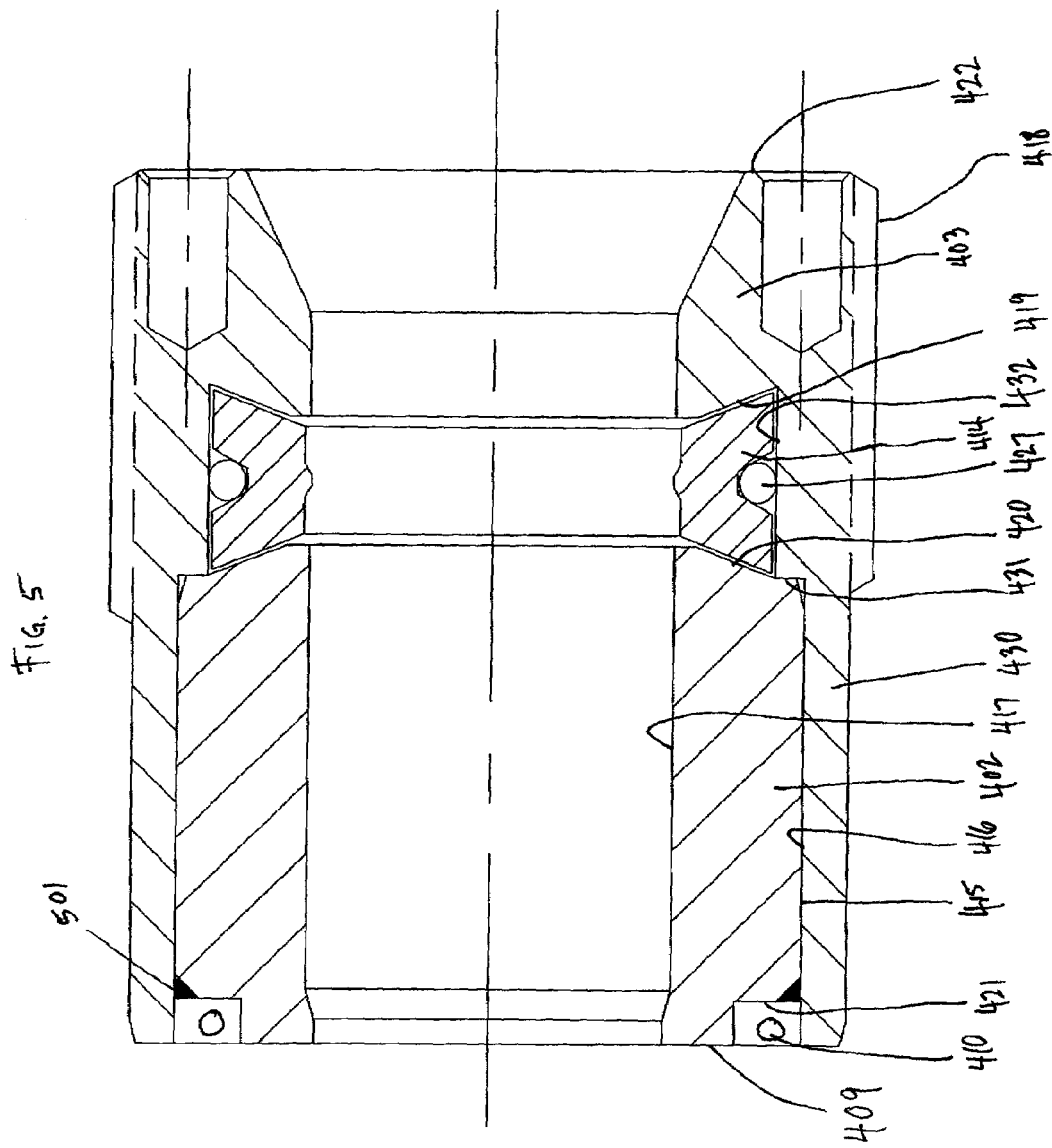
FIG. 5 is a section view of the seal retainer of the coupling of the present invention according to a fifth embodiment.

In a fifth embodiment of the invention, as shown in FIG. 5, the first inner ring and second outer ring are the same as the fourth embodiment, with a weld 501 between the outer circumference 415 of the inner ring and the first inner circumference 416 of the outer ring.

Figure 6:
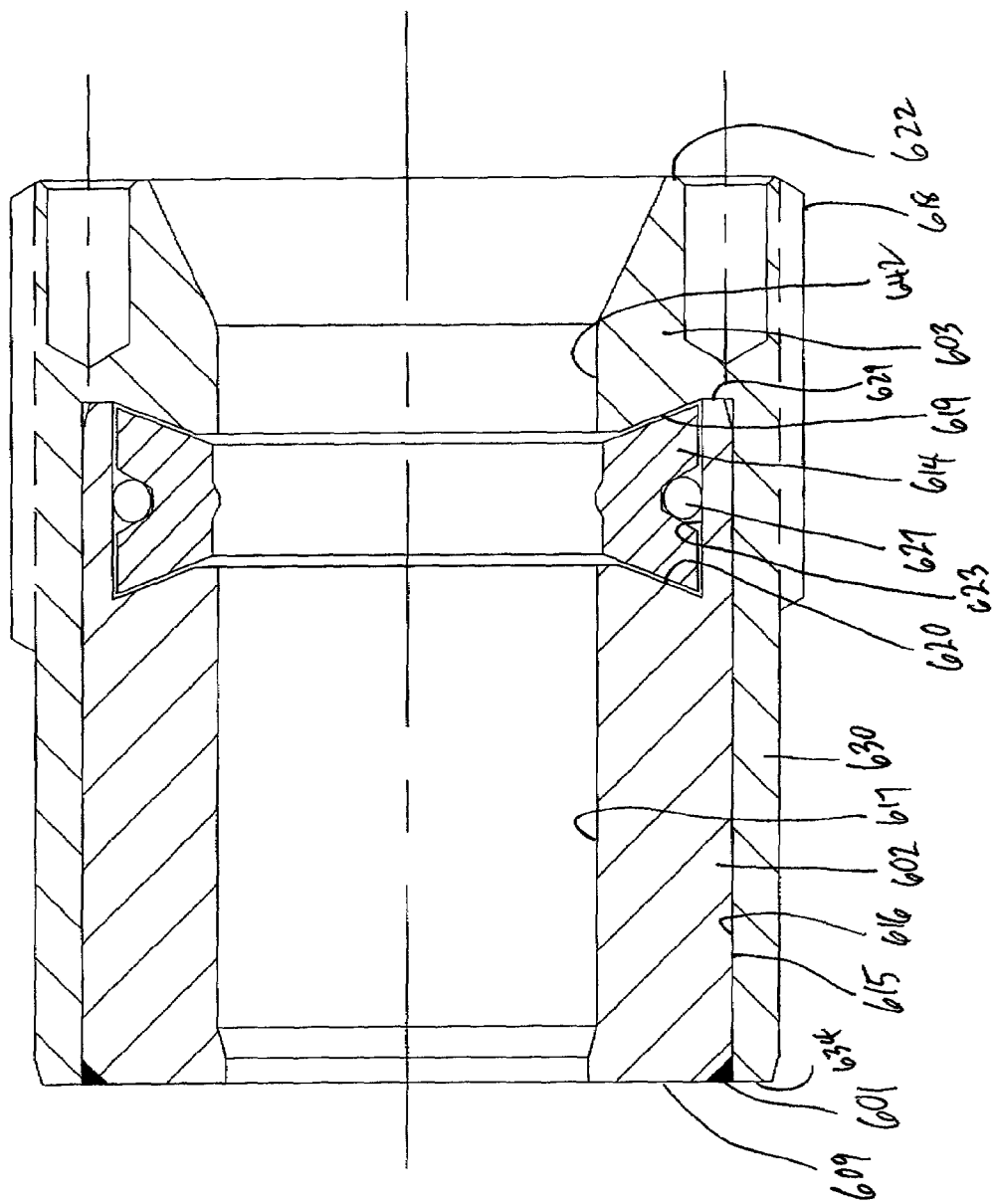
FIG. 6 is a section view of the seal retainer of the coupling of the present invention according to a sixth embodiment.

A sixth embodiment of the seal retainer of the present invention is shown in FIG. 6. The first inner ring 602, or seal cartridge, is positioned inside the second outer ring 603, or threaded shell. If desired, there may be a slight interference fit. In the sixth embodiment, weld 601 may permanently engage the first inner ring and outer ring together. Fully inserted into the receiving chamber, first end 609 of first inner ring 602 abuts a shoulder in the female receiving chamber. The first inner ring 602 has an outer circumference 615. The second outer circumference fits into part of the second ring 603 of the seal retainer, and terminates at second end 629. The first inner ring has a stepped inner circumference, with a first inner circumference 617 extending from the first end 609 to inclined shoulder 620, and a second inner circumference 623 from shoulder 620 to the second end 629.

The second outer ring 603, or threaded shell, is concentric with the inner ring. The second outer ring has a first inner circumference 616 and a smaller second inner circumference 642. The first inner circumference of the second outer ring is dimensioned to receive the outer circumference of the first inner ring. At least part of the outer circumference 618 of the second outer ring is threaded for engagement with the female coupling member. The threaded area may extend from the first end 622 of the second outer ring to the second end 634 of the second outer ring, or may terminate at a position along section 630 before reaching the second end. Preferably, the threaded area extends at least one half of the combined length of the first and second rings when they are assembled together. The threaded area is sufficient to apply and maintain torque to the second outer ring that eliminates or minimizes any gap between the first end 609 of the first inner ring and the shoulder in the female member receiving chamber against which the first inner ring abuts.

An elastomeric seal 614 may be positioned between inclined shoulder 620 of the first inner ring and inclined shoulder 619 of the second outer ring. The inclined shoulders restrain the seal from radial movement or implosion due to a vacuum when the male member is withdrawn from the receiving chamber. The seal may have a dovetail interfit with the inclined shoulders. The seal also may include an O-ring 627 in a groove at its outer circumference.

Figure 8:
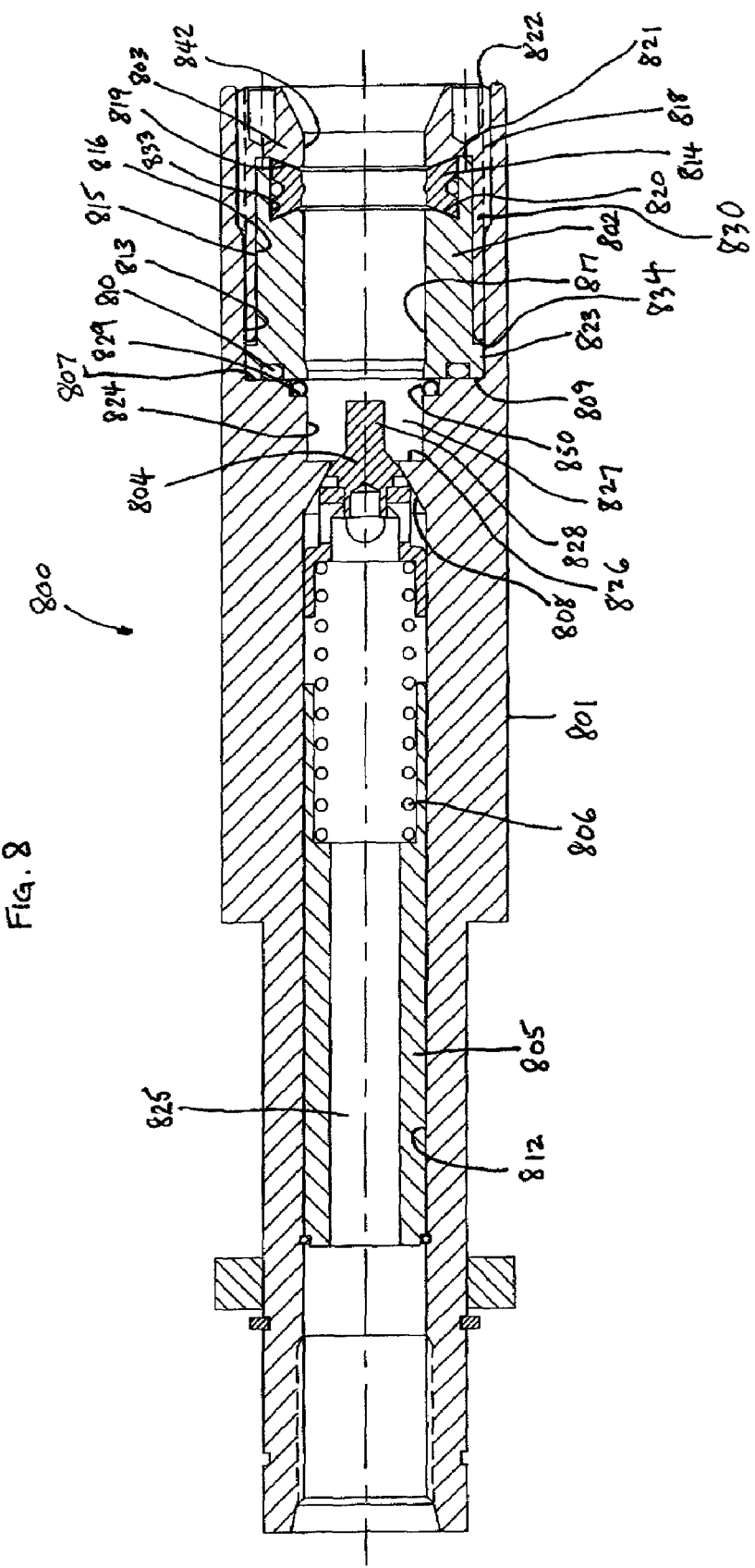
FIG. 8 is a section view of the female member of the coupling of the present invention according to a seventh embodiment.

As shown in FIG. 8, in a seventh embodiment, female member 800 comprises body 801 with a central bore 825 which has several variations in its diameter as it extends through the female member. The first end of the bore may be internally threaded for connection to a hydraulic line. A cylindrical passageway extends longitudinally within the female member body and terminates at valve seat 808.

Adjacent valve seat 808 is shoulder 826 which forms one end of receiving chamber 827.

In the embodiment of FIG. 8, the receiving chamber which receives the probe of a male coupling member has a stepped internal diameter with an internal shoulder 807 between a first smaller diameter 824 and a second larger diameter 813. Optionally, a second internal shoulder 829 may be included in the receiving chamber. A ring shaped seal 850 may be positioned on shoulder 829 in the receiving chamber of the female member. The ring shaped seal may be a metal seal, or an elastomeric or polymer seal.

The female member may include poppet valve 804 which is slidably received within cylindrical passageway 812. The poppet valve is conical in shape and has an actuator 828 extending from the apex of the poppet valve. The poppet valve is urged by valve spring 806 into a closed position against valve seat 808. When the poppet valve is in the closed position against the valve seat, it seals fluid from flowing through the female member. Hollow spring collar 805 anchors the valve spring 806 and is held in place by a collar clip.

Figure 11:
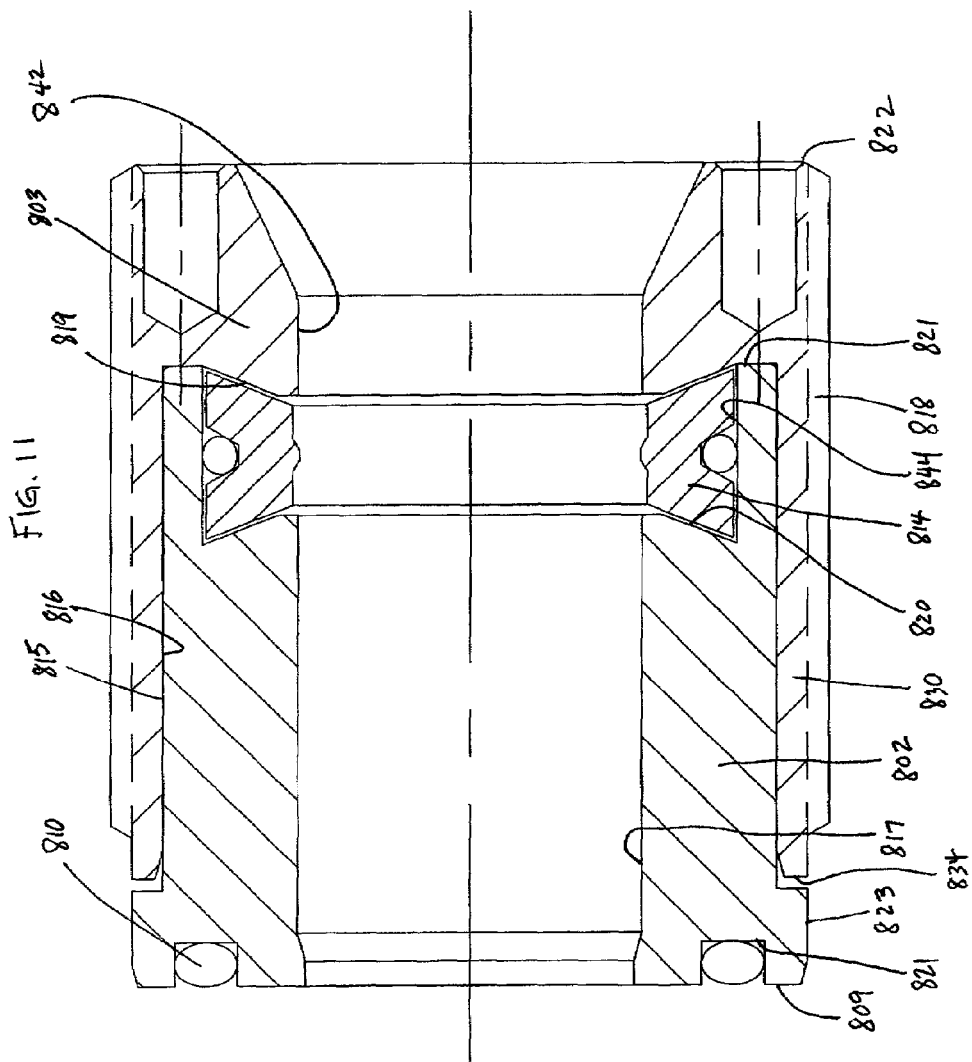
FIG. 11 is a section view of the seal retainer of the coupling according to the embodiment of FIG. 8.

As shown in more detail in FIG. 11, the seal retainer in the seventh embodiment of the invention comprises first inner ring 802, or seal cartridge, and second outer ring 803, or threaded shell. Both rings are positioned in the receiving chamber of the female member for holding one or more seals in the female member, even when the coupling members are disengaged. The first inner ring and second outer ring are concentric, with at least part of the first inner ring fitting radially inside the second outer ring.

The first inner ring 802, or seal cartridge, is positioned inside the second outer ring 803, or threaded shell. This may be done before they are inserted into the receiving chamber. If desired, there may be a slight interference fit. Fully inserted into the receiving chamber, first end 809 of first inner ring 802 abuts shoulder 807. The first end of the first inner ring may include a groove 821 for holding elastomeric O-ring 810 which provides a seal between the receiving chamber and the first end of the inner ring. The first inner ring 802 has a stepped outer circumference, with a first outer circumference 823 and a second outer circumference 815 having a smaller diameter than the first outer circumference. The first outer circumference may have a sliding fit with diameter 813 of the receiving chamber. The second outer circumference fits into part of the second ring 803 of the seal retainer, and terminates at second end 821. The first inner ring also has a stepped inner circumference, with a first inner circumference 817 extending from the first end 809 to inclined shoulder 820, and a second inner circumference 844 from shoulder 820 to the second end 821.

The second outer ring 803, or threaded shell, is concentric with the inner ring. The second outer ring has a first inner circumference 816 and a smaller second inner circumference 842. The first inner circumference of the second outer ring is dimensioned to receive the second outer circumference of the first inner ring. At least part of the outer circumference 818 of the second outer ring is threaded for engagement with the female coupling member. The threaded area may extend from the first end 822 of the second outer ring to the second end 834 of the second outer ring, or may terminate at a position along section 830 before reaching the second end. Preferably, the threaded area extends at least one half of the combined length of the first and second rings when they are assembled together. The threaded area should be sufficient to apply and maintain torque to the second outer ring to eliminate or minimize any gap between the first end 809 of the first inner ring and the shoulder 807 in the female member receiving chamber.

An elastomeric seal 814 may be positioned between inclined shoulder 820 of the first inner ring and inclined shoulder 819 of the second outer ring. The inclined shoulders restrain the seal from radial movement or implosion due to a vacuum when the male member is withdrawn from the receiving chamber. The seal may have a dovetail interfit with the inclined shoulders. The seal also may include an O-ring in a groove at its outer circumference.

Figure 9:
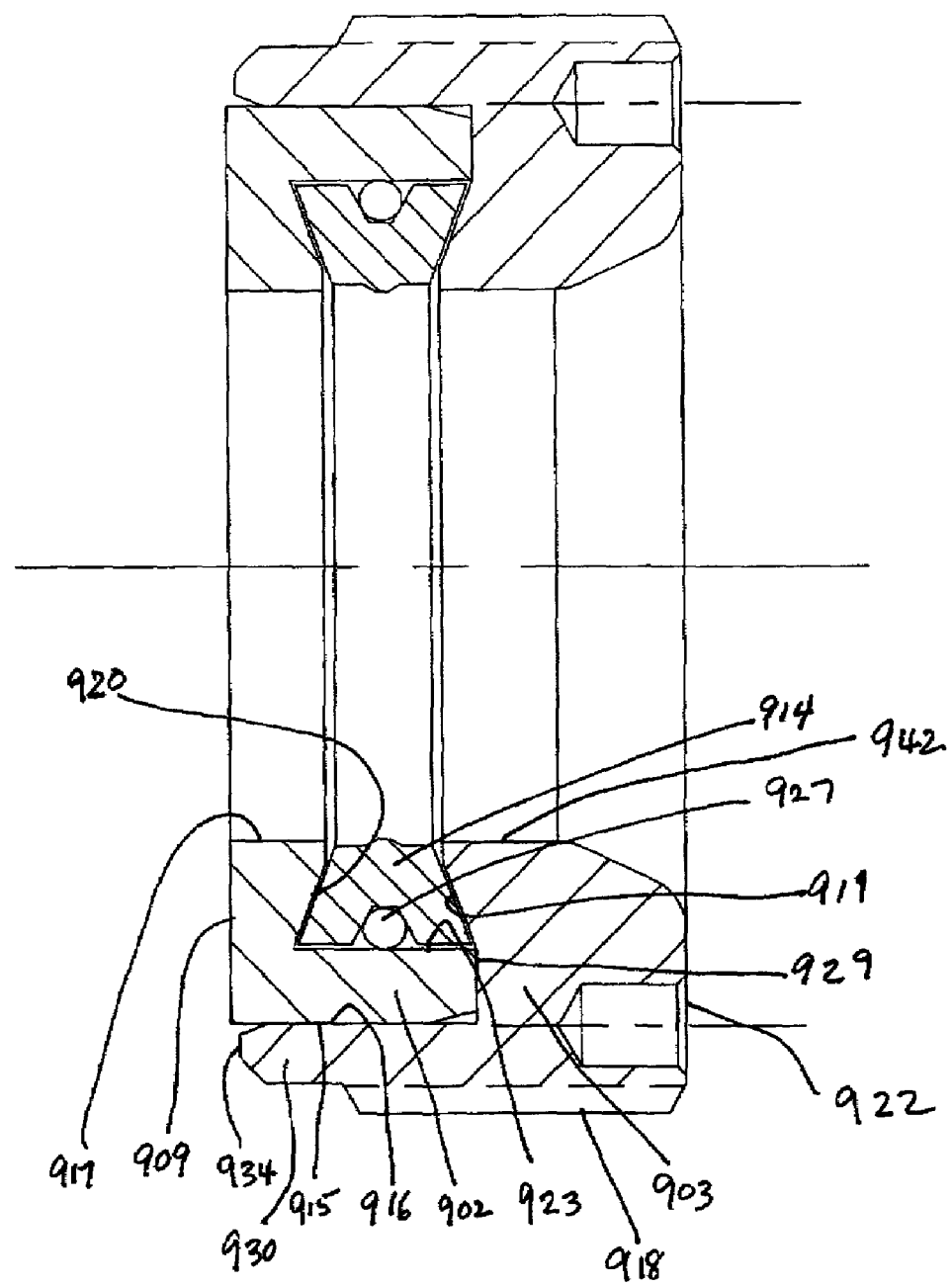
FIG. 9 is a section view of the seal retainer of the coupling of the present invention according to an eighth embodiment.

An eighth embodiment of the seal retainer of the invention is shown in FIG. 9. The first inner ring 902, or seal cartridge, is positioned inside the second outer ring 903, or threaded shell. If desired, there may be a slight interference fit. Fully inserted into the receiving chamber, first end 909 of first inner ring 902 abuts a shoulder in the receiving chamber. The first inner ring 902 has an outer circumference 915. The outer circumference fits into part of the second ring 903 of the seal retainer, and terminates at second end 929. The first inner ring has a stepped inner circumference, with a first inner circumference 917 extending from the first end 909 to inclined shoulder 920, and a second inner circumference 923 from shoulder 920 to the second end 929.

The second outer ring 903, or threaded shell, is concentric with the inner ring. The second outer ring has a first inner circumference 916 and a smaller second inner circumference 942. The first inner circumference of the second outer ring is dimensioned to receive the outer circumference of the first inner ring. At least part of the outer circumference 918 of the second outer ring is threaded for engagement with the female coupling member. The threaded area may extend from the first end 922 of the second outer ring to the second end 934 of the second outer ring, or may terminate at a position along section 930 before reaching the second end. Preferably, the threaded area extends at least one half of the combined length of the first and second rings when they are assembled together. The threaded area should be sufficient to apply and maintain torque to the second outer ring that eliminates or minimizes any gap between the first end 909 of the inner ring and the shoulder in the female member receiving chamber.

An elastomeric seal 914 may be positioned between inclined shoulder 920 of the first inner ring and inclined shoulder 919 of the second outer ring. The inclined shoulders restrain the seal from radial movement or implosion due to a vacuum when the male member is withdrawn from the receiving chamber. The seal may have a dovetail interfit with the inclined shoulders. The seal also may include an O-ring 927 in a groove at its outer circumference.

Figure 10:
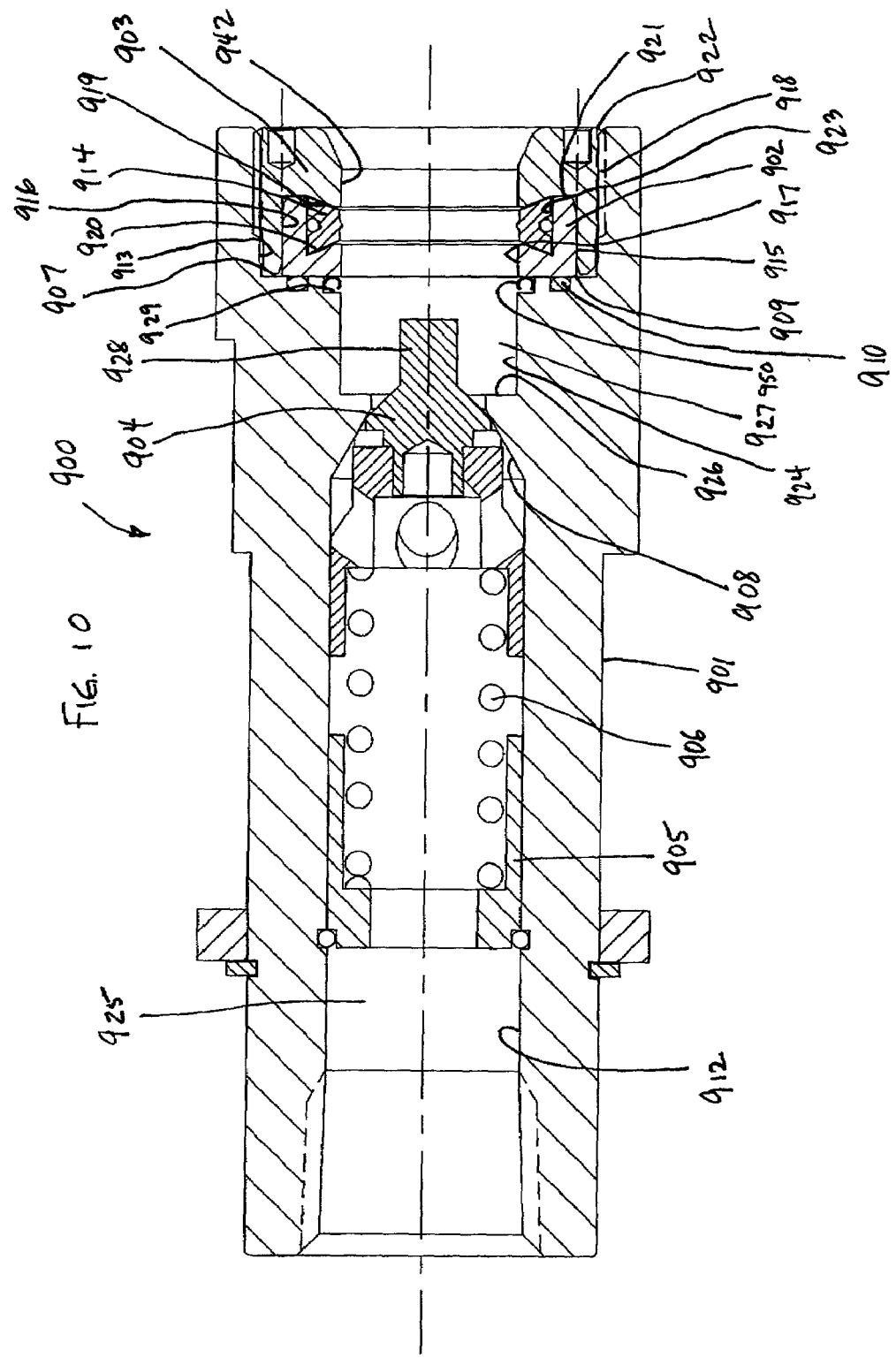
FIG. 10 is a section view of the female member of the coupling of the present invention according to the embodiment of FIG. 9.

As shown in FIG. 10, in the eighth embodiment, female member 900 comprises body 901 with a central bore 925 which has several variations in its diameter as it extends through the female member. The first end of the bore may be internally threaded for connection to a hydraulic line. A cylindrical passageway extends longitudinally within the female member body and terminates at valve seat 908. Adjacent valve seat 908 is shoulder 926 which forms one end of receiving chamber 927.

In the eighth embodiment, the receiving chamber which receives the probe of a male coupling member has a stepped internal diameter with an internal shoulder 907 between a first smaller diameter 924 and a second larger diameter 913. An O-ring 910 may be positioned in a groove on internal shoulder 907. Optionally, a second internal shoulder 929 may be included in the receiving chamber. A ring shaped seal 950 may be positioned on shoulder 929 in the receiving chamber of the female member. The ring shaped seal may be a metal seal, or an elastomeric or polymer seal.

The female member may include poppet valve 904 which is slidably received within cylindrical passageway 912. The poppet valve is conical in shape and has an actuator 928 extending from the apex of the poppet valve. The poppet valve is urged by valve spring 906 into a closed position against valve seat 908. When the poppet valve is in the closed position against the valve seat, it seals fluid from flowing through the female member. Hollow spring collar 905 anchors the valve spring 906 and is held in place by a collar clip.

Any of the embodiments of the present invention may include an O-ring around the outer circumference of the first inner ring of the seal retainer. Hydrostatic pressure from seawater may act against the seal to push the seal retainer against the internal shoulder in the female coupling member. As a result, this additional pressure further enhances the contact pressure and minimizes or eliminates any gap between the seal retainer and female member.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling member, comprising:
   (a) a female member having an internal bore with a receiving chamber having an internal shoulder, and a valve for controlling fluid flow through the bore;
   (b) a seal retainer insertable into the receiving chamber; the seal retainer having a first inner ring and a second outer ring concentric with the first inner ring; at least part of the first inner ring fitting radially inside the second outer ring in an engaged position; the first inner ring having a first end abutting the internal shoulder in the receiving chamber; at least part of the second outer ring having an externally threaded area to engage the female member; and
   (c) a first ring-shaped seal positioned between the first inner ring and second outer ring; and a second ring-shaped seal positioned between the first inner ring and the internal shoulder.

2. The undersea hydraulic coupling member of claim 1 wherein the first ring-shaped seal has a wedge-shaped cross section and a dovetail interfit between the first inner ring and second outer ring.

3. The undersea hydraulic coupling member of claim 1 wherein the first inner ring has a groove in the first end thereof for positioning the second ring-shaped seal therein.

4. The undersea hydraulic coupling member of claim 1 wherein the first inner ring has a stepped outer circumference with a first part and a second part, the first part having a sliding interfit with the receiving chamber.

5. The undersea hydraulic coupling member of claim 1 wherein the second outer ring has a stepped inner circumference with a first part and a second part, the first part having a sliding interfit with the first inner ring.

6. The undersea hydraulic coupling member of claim 1 wherein the externally threaded area extends longitudinally at least one half of the length of the first inner ring and second outer ring in the engaged position.

7. The undersea hydraulic coupling member of claim 1 further comprising a groove around the outer circumference of the first inner ring and an 0-ring seal positioned in the groove.

8. A female member of an undersea hydraulic coupling, comprising:
   (a) a body member with an internal bore extending therethrough, the internal bore having a receiving chamber adjacent a first end thereof;
   (b) a ring-shaped resilient seal insertable into the receiving chamber and having an outer circumference, an inner circumference, the outer circumference being thicker in cross section than the inner circumference; and
   (c) a seal retainer engaged to the receiving chamber; the seal retainer having a first inner ring engaged to a second outer ring; the ring-shaped resilient seal retained between the first inner ring and second outer ring; at least part of the first inner ring held radially inside the second outer ring; part of the second outer ring having external threads engaged to the receiving chamber.

9. The female member of an undersea hydraulic coupling of claim 8, further comprising a second ring-shaped resilient seal between the first inner ring and the receiving chamber.

10. The female member of an undersea hydraulic coupling of claim 8, wherein the second outer ring has a stepped internal surface with a first internal diameter and a second smaller internal diameter, the first inner ring held radially inside the first internal diameter.

11. The female member of an undersea hydraulic coupling of claim 8, wherein the ring-shaped resilient seal has a dovetail interfit between the first inner ring and the second outer ring.

12. The female member of an undersea hydraulic coupling of claim 8, further comprising a second ring-shaped resilient seal around the outer circumference of the seal retainer.

13. An undersea hydraulic coupling member comprising:
   (a) a female member having an internal bore, the internal bore having at least one shoulder surface;
   (b) a ring-shaped seal positioned in the internal bore having an outer circumference with a thicker cross section than the inner circumference; and
   (c) a seal retainer insertable into the internal bore and having a first inner ring removably inserted through at least part of a concentric second outer ring; the first inner ring having a first end abutting the at least one shoulder surface in the internal bore, and an inclined shoulder engaging the ring-shaped seal; the second outer ring having an inclined shoulder engaging the ring-shaped seal, and a threaded area engaging the female member.

14. The undersea hydraulic coupling member of claim 13 wherein the ring-shaped seal has a wedge-shaped cross section with a dovetail interfit between the inclined shoulders of the first inner ring and the second outer ring.

15. The undersea hydraulic coupling member of claim 13 further comprising an elastomeric ring-shaped seal positioned between the first inner ring and the at least one shoulder surface in the internal bore.

16. The undersea hydraulic coupling member of claim 13 wherein the coupling member has a poppet valve in the internal bore.

17. The undersea hydraulic coupling member of claim 13 further comprising a second ring-shaped seal around the outer circumference of the first inner ring.

* * * * *